United States Patent

Maya et al.

[11] Patent Number: 5,845,328
[45] Date of Patent: Dec. 1, 1998

[54] METHOD FOR ENSURING DATA COHERENCY FOR REDUNDAT STORAGE BY TRANSFERRING COPIES OF ACCESS REQUESTS FROM ON-LINE STORAGE TO BACK-UP STORAGE

[75] Inventors: Yuzuru Maya; Soichi Isono, both of Sagamihara; Akira Ohtsuji, Yokohama, all of Japan

[73] Assignee: Hitachi, Ltd., Tokyo, Japan

[21] Appl. No.: 766,455

[22] Filed: Dec. 12, 1996

[30] Foreign Application Priority Data

Dec. 20, 1995 [JP] Japan .................................. 7-331356

[51] Int. Cl.[6] ..................................................... G06F 12/16
[52] U.S. Cl. ................ 711/162; 395/182.04; 395/182.03
[58] Field of Search ..................................... 711/162, 114, 711/161; 395/182.11, 182.16, 183.18, 183.19, 183.2, 184.01, 185.02, 185.07, 185.08, 182.04

[56] References Cited

U.S. PATENT DOCUMENTS

| | | |
|---|---|---|
| 4,577,272 | 3/1986 | Ballew et al. . |
| 5,193,154 | 3/1993 | Kitajima et al. . |
| 5,226,157 | 7/1993 | Nakano et al. . |
| 5,313,612 | 5/1994 | Satoh et al. . |
| 5,317,739 | 5/1994 | Elko et al. . |
| 5,537,574 | 7/1996 | Elko et al. . |
| 5,548,711 | 8/1996 | Brant et al. . |

Primary Examiner—Tod R. Swann
Assistant Examiner—J. Peikari
Attorney, Agent, or Firm—Antonelli, Terry, Stout & Kraus, LLP

[57] ABSTRACT

A command is issued from a processing unit to an on-line storage unit and transferred from the on-line storage unit to a back-up storage unit. The received commands are processed in the respective storage units. An overhead of the on-line storage unit is reduced in a hot stand-by system. Storage contents of the on-line storage unit and the back-up storage unit are made coincident in a structure having a plurality of processing units, where the on-line storage unit and the back-up storage unit are connected through a channel device.

6 Claims, 12 Drawing Sheets

FIG. 5

| | EXECUTION RESULT | NORMAL/ ABNORMAL | COINCIDENT/ UNTICOINCIDENT |
|---|---|---|---|
| 80 | NORMAL COMPLETION | NORMAL | COINCIDENT |
| 81 | TIME-OUT | NORMAL | UNTICOINCIDENT |
| 82 | MEMORY SHORTAGE | ABNORMAL | COINCIDENT |
| 83 | STRUCTURE FAULT | ABNORMAL | UNTICOINCIDENT |

ON-LINE STORAGE UNIT

BACK-UP STORAGE UNIT

METHOD FOR ENSURING DATA COHERENCY FOR REDUNDAT STORAGE BY TRANSFERRING COPIES OF ACCESS REQUESTS FROM ON-LINE STORAGE TO BACK-UP STORAGE

BACKGROUND OF THE INVENTION

The present invention relates to a method for making storage contents of duplex storage unit including an on-line storage unit and a back-up storage unit coincident, and more particularly to a method for making storage contents of the duplex storage unit coincident, which assures a reception order of commands and eliminates the need to transfer a large volume of checkpoint data by transferring commands received by the on-line storage unit from a processing unit to the back-up storage unit.

In a prior art computer system having duplex storage unit connected to a plurality of processing units (central processing complexity), when a fault occurs in one of the duplex storage unit, the fault is notified to the plurality of processing units, the other storage unit is selected and the fault is recovered by making use of a recovery function of a parallel transaction server.

However, when such duplex storage unit is applied to a structure of a hot stand-by system, an amount of checkpoint data to be transferred from an on-line system to a back-up system increases due to the increase of the number of processing units and the enhancement of a processing capability, and an overhead of the on-line storage unit to transfer the data increases.

Namely, in a conventional hot stand-by system, an on-line processing unit transmits checkpoint data (checkpoint dump) to a back-up processing unit at a constant time interval. When a fault occurs in the on-line unit, the stand-by processing unit succeeds the process of the on-line unit by the checkpoint data received from the on-line system. Accordingly, when this system is applied to the computer system having the duplex storage unit, a volume of checkpoint data to be transferred from the on-line system to the back-up system increases by the increase of the number of processing units and the enhancement of the processing capability and the overhead of the on-line storage unit to transfer the data increases.

On the other hand, a hot stand-by system in which the storage contents are made coincident by assuring the simultaneous reception of commands (messages) by the on-line storage unit and the back-up storage unit without transferring the checkpoint data has been known. In this system, the on-line storage unit and the back-up storage unit are interconnected through a local area network (LAN) or a line switching device and a transmitting station of the commands occupies the LAN or the line selector device to transmit the commands in such a manner that reception orders of commands in the on-line system and the back-up system coincide.

However, when a plurality of processing units and the on-line storage unit and the back-up storage unit are connected through a channel device, the plurality of processing units may separately issue commands to the on-line storage unit and the back-up storage unit. Thus, the reception orders of the on-line storage unit and the back-up storage unit do not coincide and the storage contents of the on-line storage unit and the back-up storage unit do not coincide.

U.S. Pat. No. 5,537,574 discloses a structure to maintain data called a cache structure in a storage unit. U.S. Pat. No. 5,317,739 discloses a structure to maintain data called a list structure in a storage unit.

SUMMARY OF THE INVENTION

It is an object of the present invention to provide a method for making storage contents of duplex storage unit coincident, which can reduce an overhead of an on-line storage unit when the duplex storage unit is applied to a computer structure of a hot-stand-by system.

It is another object of the present invention to provide a method for making storage contents of an on-line storage unit and a back-up storage unit even in a structure having a plurality of processing units, the on-line storage unit and the back-up storage unit connected through a channel device.

In order to achieve the above object, the present invention is characterized by that the processing unit issues commands to only the on-line storage unit and causes the on-line storage unit to transfer the command to the back-up storage unit, and the processes for the received commands are executed by the respective storage units.

When the processing unit accesses the storage unit, it issues the command to only the on-line storage unit. When the on-line storage unit receives the command, it transfers the command to the back-up storage unit and executes the process for the received command and returns a process result to the processing unit.

On the other hand, the back-up storage unit executes the process for the command received from the on-line storage unit.

Accordingly, the reception orders of the commands in the on-line storage unit and the back-up storage unit always coincide, and the storage contents of both storage units coincide even if the on-line storage unit and the back-up storage unit are connected through the channel device.

Further, since the on-line storage unit transmits commands which are less in volume than the checkpoint data to the back-up storage unit in place of the checkpoint data, the overhead of the on-line storage unit is reduced.

The storage unit includes a cache structure to provide a data cache function and a list structure to provide a message communication function and a data lock function.

When the processing unit having such structures accesses the storage unit, the on-line storage unit executes the process for the command received from the processing unit and returns the process result to the processing unit. In this case, the on-line storage unit decodes the received command, and if the received command is one to update the cache structure or the list structure, it transmits the command to the back-up storage unit. The back-up storage unit executes the process for the received command and returns a response to the on-line storage unit. Finally, the on-line storage unit returns the response to the processing unit.

However, if the received command is not one to update the structure, the on-line storage unit does not transmit the received command to the back-up storage unit. Only the on-line storage unit executes the process for the command and returns a response to the processing unit.

As a result, the on-line storage unit and the back-up storage unit execute the same commands in the same order so that the storage contents of the on-line storage unit and the back-up storage unit coincide.

BRIEF DESCRIPTION OF THE DRAWINGS

FIG. 5 shows classification of execution results of commands to the on-line storage unit and the back-up storage unit.

DESCRIPTION OF THE PREFERRED EMBODIMENTS

Embodiments of the present invention are now explained in detail with reference to the drawings.

Figure 1:
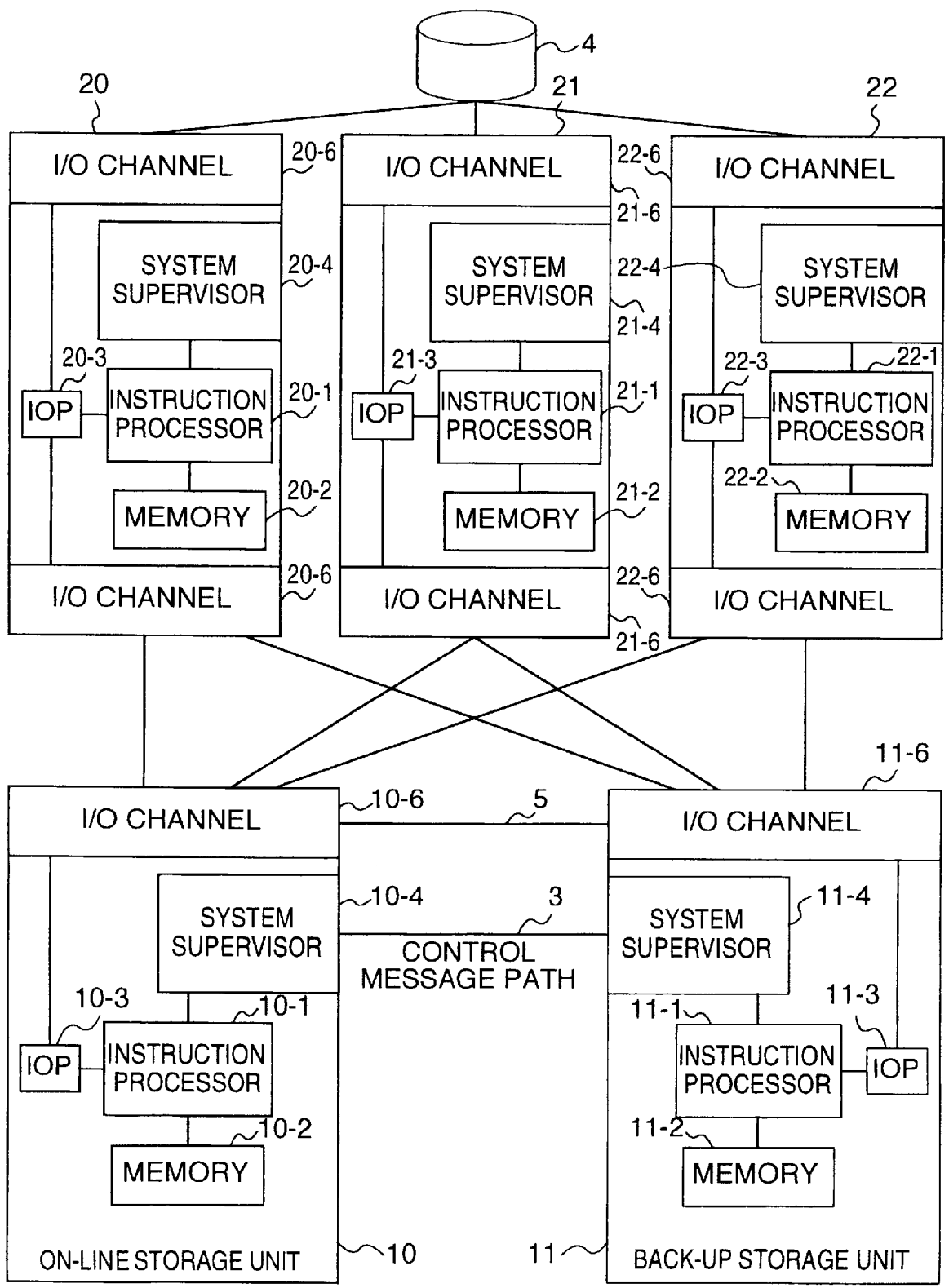
FIG. 1 shows a system configuration of hardware-of a parallel computer system in accordance with the present invention.

FIG. 1 shows a system configuration of an embodiment of a parallel computer system in accordance with the present invention and it comprises an on-line storage unit 10, a back-up storage unit 11 and three processing units 20~22.

Hardware configurations of the storage units 10 and 11 and the processing units 20~22 are identical and comprise command processors 10-1~22-1, memories 10-2~22-2, IOP 10-3~22-3, system supervisor devices 10-4~22-4 and input/output channels 10-6~22-6, respectively.

Each of the processing units 20~22 is connected to the two storage units 10 and 11 by the input/output channels 20-6~22-6. In other words, the two storage units 10 and 11 can be accessed from any one of the processing units 20~22.

System supervisor devices 10-4~11-4 of the two storage units 10 and 11 are connected by a control message path 3 through which a message to reset the storage unit of the partner system is communicated.

The processing units 20~22 share a disk 4.

The storage units 10 and 11 include a cache structure to provide a data cache function of the processing units 20~22 and a list structure to provide a message communication function among the processing units 20~22 and an exclusive control function of data.

Figure 2:
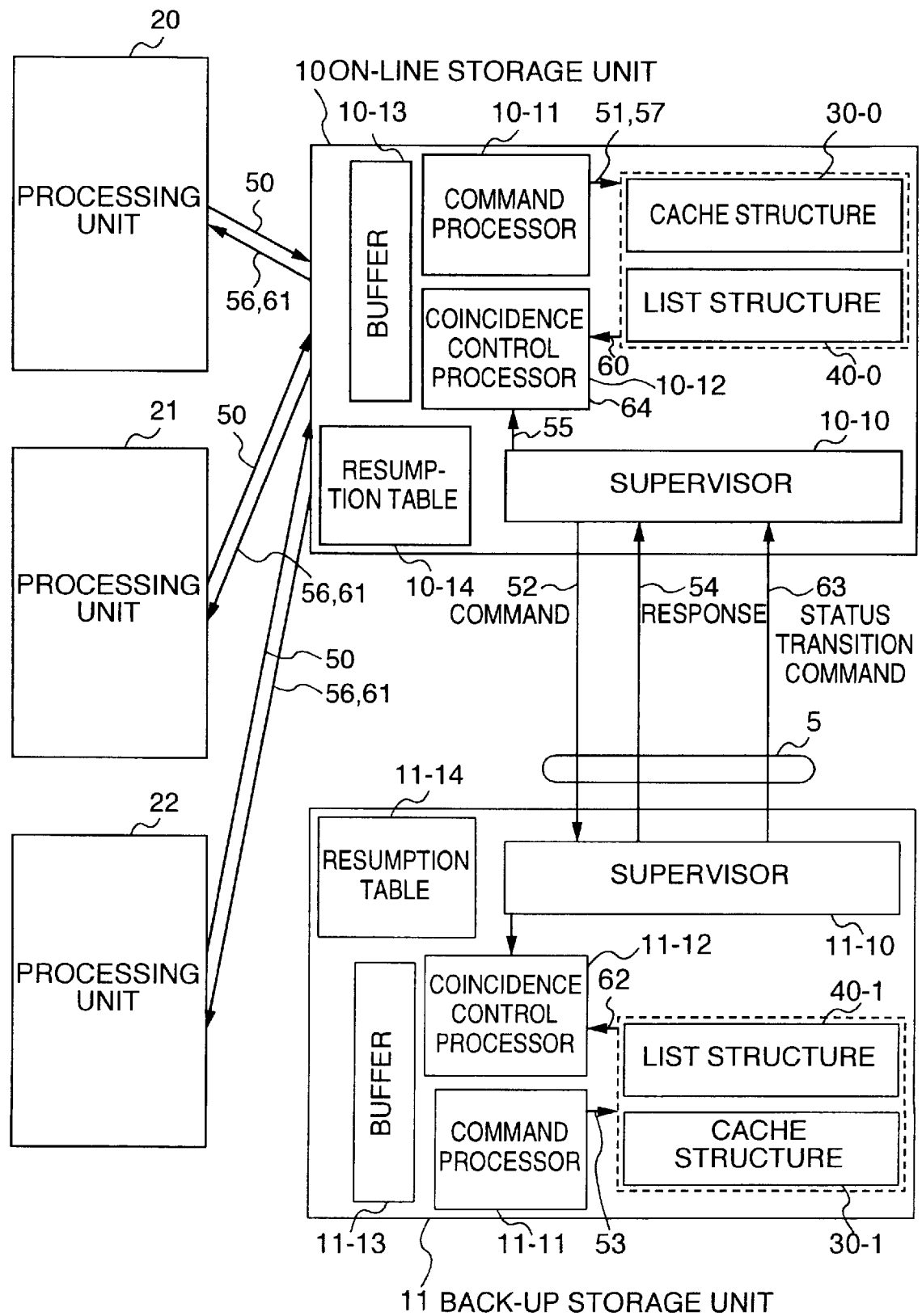
FIG. 2 shows a software configuration of a duplex storage unit.

FIG. 2 shows a software configuration of the storage units 10 and 11. The on-line storage unit 10 comprises a supervisor 10-10, a command processor 10-11 and a coincidence control processor 10-12. It further comprises a buffer 10-13 for storing a received command and a resumption table 10-14 which is used when a timer to monitor a command process is timed out.

The command processor 10-11 executes the command and the coincidence control processor 10-12 checks if execution results of the command in the on-line storage unit 10 and the back-up storage unit 11 coincide.

The software of the back-up storage unit 11 is of identical configuration to the software of the on-line storage unit 10 and comprises a supervisor 11-10, a command processor 11-11 and a coincidence control processor 11-12. It further comprises a buffer 11-13 for storing the received command and a resumption table 11-14 used at the time-out.

An operation of the above configuration is described below.

When the processing units 20~22 access the on-line and back-up storage units 10 and 11, the processing units 20~22 transmit corresponding commands to the on-line storage unit 10.

When the command processor 10-11 of the on-line storage unit 10 receives the command from any one of the processing units 20~22, it executes a process for the received command to access the cache structure 30-0 or the list structure 40-0 in the storage unit 10 (step 51).

If the command is one to update the content of the storage units 10 and 11 (the cache structure or the list structure), the supervisor 10-10 of the on-line storage unit 10 transmits that command to the back-up storage unit 11 (step 52). The command is transmitted through the communication path 5 between the storage units 10 and 11.

The command processor 11-11 of the back-up storage unit 11 executes a process for the received command, that is, the updating process for the cache structure 30-1 or the list structure 40-1 (step 53) and the supervisor 11-10 transmits back a response massage to the on-line storage unit 10 (step 54). The response message is transmitted through the communication path 5 between the storage units 10 and 11.

The coincidence control processor 10-12 of the on-line storage unit 10 checks if the execution results for the command in both storage units 10 and 11 coincide or not (step 55), and returns the result to the processing units 20~22 (step 56). Thereafter, the processing units execute process in accordance with the received result.

The on-line storage unit 10, however, does not transmit the commands received from the processing units 20~22 to the back-up storage unit 11 if the command is not one to update the cache structure or the list structure.

Accordingly, if the command received from the processing units 20~22 is not the update command for the cache structure or the list structure, only the on-line storage unit 10 executes the process for the command and transmits back the read data to the processing units 20~22 (step 57).

If a status transition occurs in the cache structure 30-0 or the list structure 40-0 of the on-line storage unit 10 (step 60), the on-line storage unit 10 issues a status transition command to notify the status transition to the processing units 20~22 (step 61).

On the other hand, if the status transition occurs in the cache structure 30-1 or the list structure 40-1 of the back-up storage unit 11 (step 62), the back-up storage unit 11 issues a status transition command to the on-line back-up 10 (step 63). The status transition command is transmitted through the communication path 5 between the storage units 10 and 11.

The on-line storage unit 10 determines whether the same status transition command has been issued in the storage units 10 and 11 within a predetermined period by the coincidence control processor 10-12 (step 64). The subsequent steps will be described in detail with reference to FIG. 12.

Figure 3:
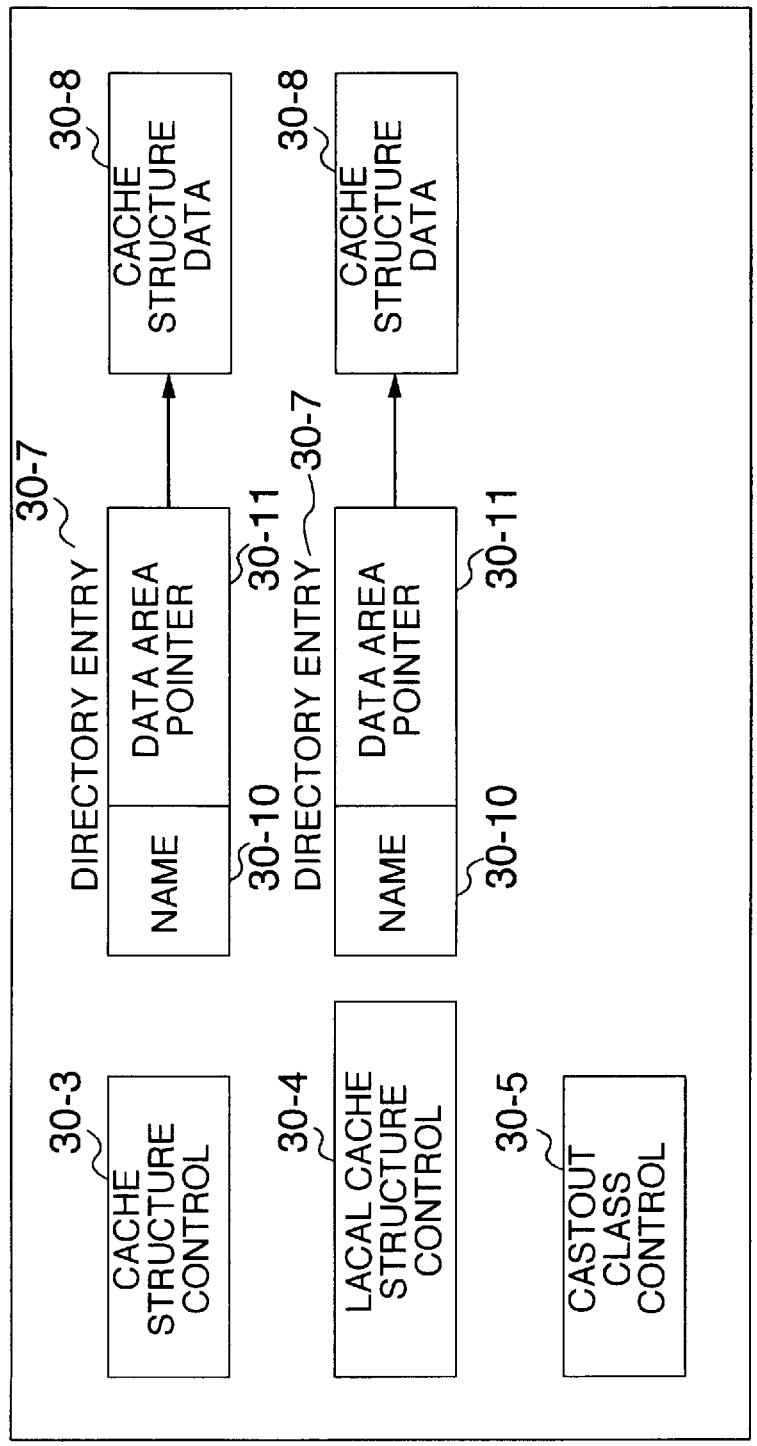
FIG. 3 shows a cache structure in an on-line storage unit and a back-up storage unit.

FIG. 3 shows detail of the cache structure 30-1

As described in U.S. Pat. No. 5,537,574 "Sysplex Shared Data Coherency Method", the cache structure comprises cache structure control information 30-3, local cache structure control information 30-4, castout class control information 30-5, a directory entry 30-7 and cache structure data 30-8.

The cache structure control information 30-3 is control information relating to the cache structure such as a structure size and the number of castout classes. The local cache control information 30-4 is information which is effective when a local cache (a cache in the processing unit) is allocated to an SES cache (a cache in the storage unit).

The castout class control information 30-5 is information for a castout process to store updated data in the disk 4.

The directory entry 30-7 includes a cache name 30-10 and a data area pointer 30-11. Data is identified by the cache name 30-10 and a storage location of the cache structure data 30-8 is specified by the data area pointer 30-11.

The number of directory entries 30-7 has an upper limit, and when the upper limit is reached, a message of memory shortage is notified to the processing units 20~22.

Figure 4:
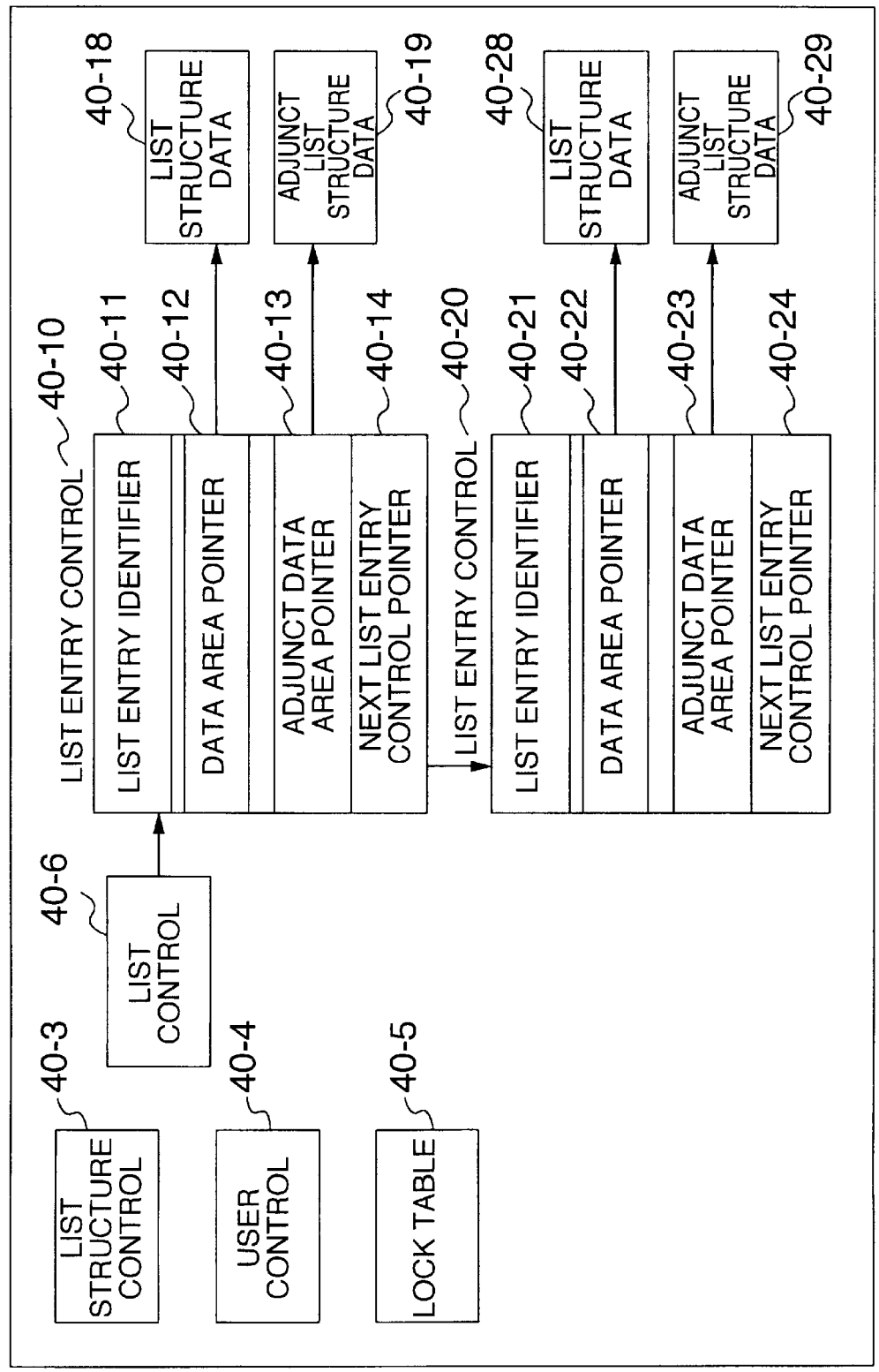
FIG. 4 shows a list structure in the on-line storage unit and the back-up storage unit.

FIG. 4 shows detail of the list structure.

As described in U.S. Pat. No. 5,317,739 "Method and Apparatus for Coupling Data Processing Systems", the list structure comprises list structure control information 40-3, user control information 40-4, a lock table 40-5, list control information 40-6, list entry control information 40-10, list structure data 40-18 and adjunct list structure data 40-19. The next list entry control information 40-20 is associated with the list entry control information 40-10 by a pointer.

The list structure control information 40-3 is control information relating to the list structure such as a structure size and the number of lists. The user control information 40-4 if user-defined information. The lock table 40-5 is a table to exclusively control the reading and the writing of the list entry control information 40-10.

The list control information 40-6 is information indicating a count of the list entries and a maximum value thereof. The list entry control information 40-10 and 40-20 comprise list entry identifiers 40-11 and 40-21 for identifying the list structure data 40-18 and 40-28 and the adjunct list structure data 40-19 and 40-29, pointers (data area pointers) 40-12 and 40-22 to the data 40-18 and 40-58, pointers (adjunct data pointers) 40-13 and 40-23 to the adjunct data 40-19 and 40-29, and pointers (next list entry pointers) 40-14 and 40-24 to the next list entry information.

The numbers of the list entry control information 40-10 and 40-2 have upper limits, and when the upper limit is reached, a message of memory shortage is notified to the processing units 20~22.

FIG. 5 shows an execution result for the command.

The command execution result includes four classes, normal completion 80, time-out 81, memory shortage 82 and structure fault 83.

The normal completion 80 results in when the command is correctly executed. The status of the storage unit is normal and the execution result of the command in the on-line storage unit 10 and the execution result of the command in the back-up storage unit 11 necessarily coincide.

As for the time-out 81, the status of the storage units 10 and 11 are normal but the storage units 10 and 11 return responses to the processing units within a predetermined time period because the amount of execution process is large or the waiting time is long. The execution results of the command in the on-line storage unit 10 and the back-up storage unit 11 do not always coincide if the resumption point is included. One of the storage units 10 and 11 may normally complete.

The memory shortage 82 indicates the non-execution of the write process for the write command because of lack of empty entry when the directory entry information 30-7 or the list entry control information 40-10 and 40-20 are written. The execution results of the command in the on-line storage unit 10 and the back-up storage unit 11 always coincide.

The fault 83 indicates that the access to the memories 10-2 and 11-2 of the storage units 10 and 11 is not attained.

Figure 6:
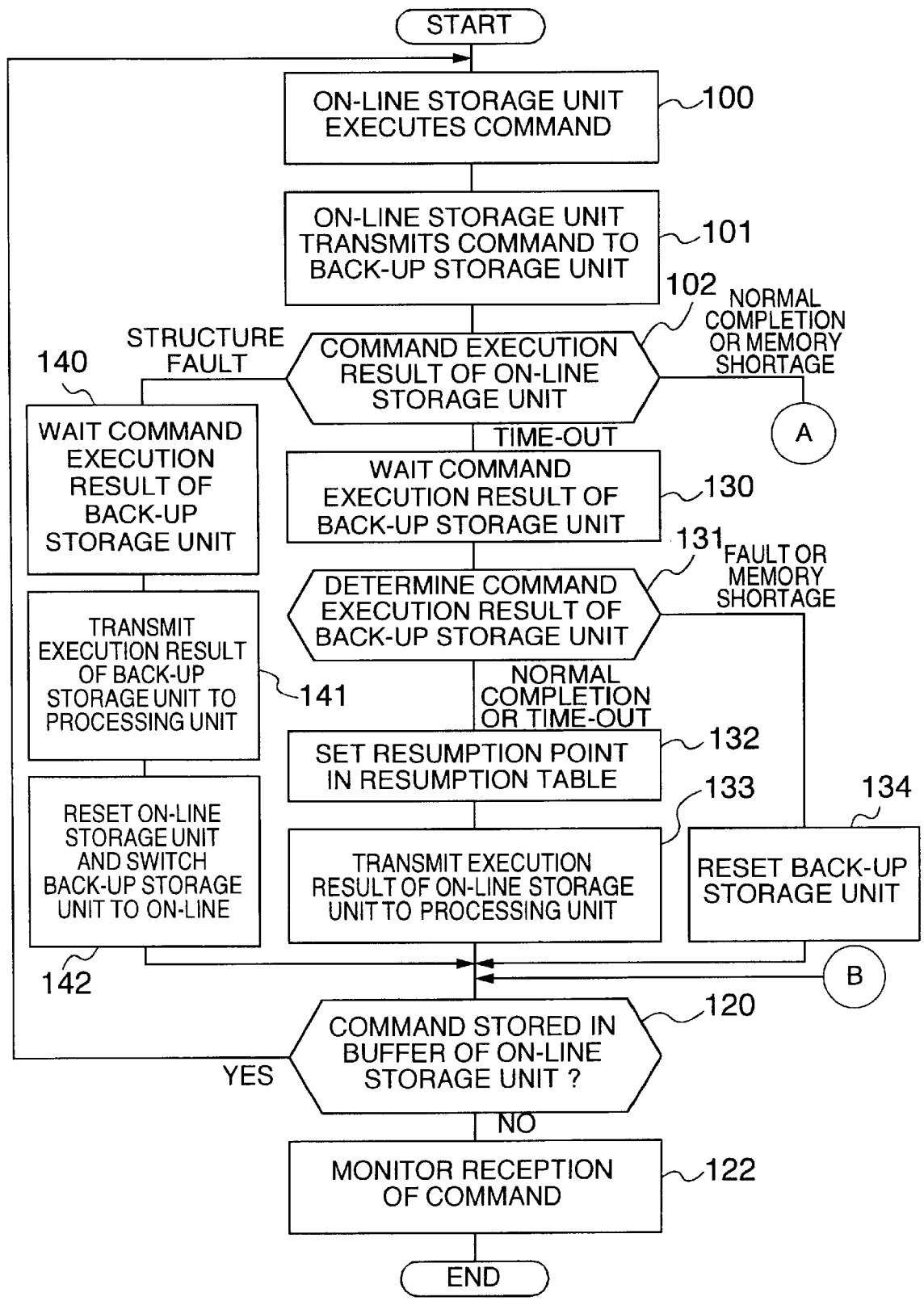
FIG. 6 shows a flow chart of a process in the storage unit for a command received from a processing unit.
Figure 7:
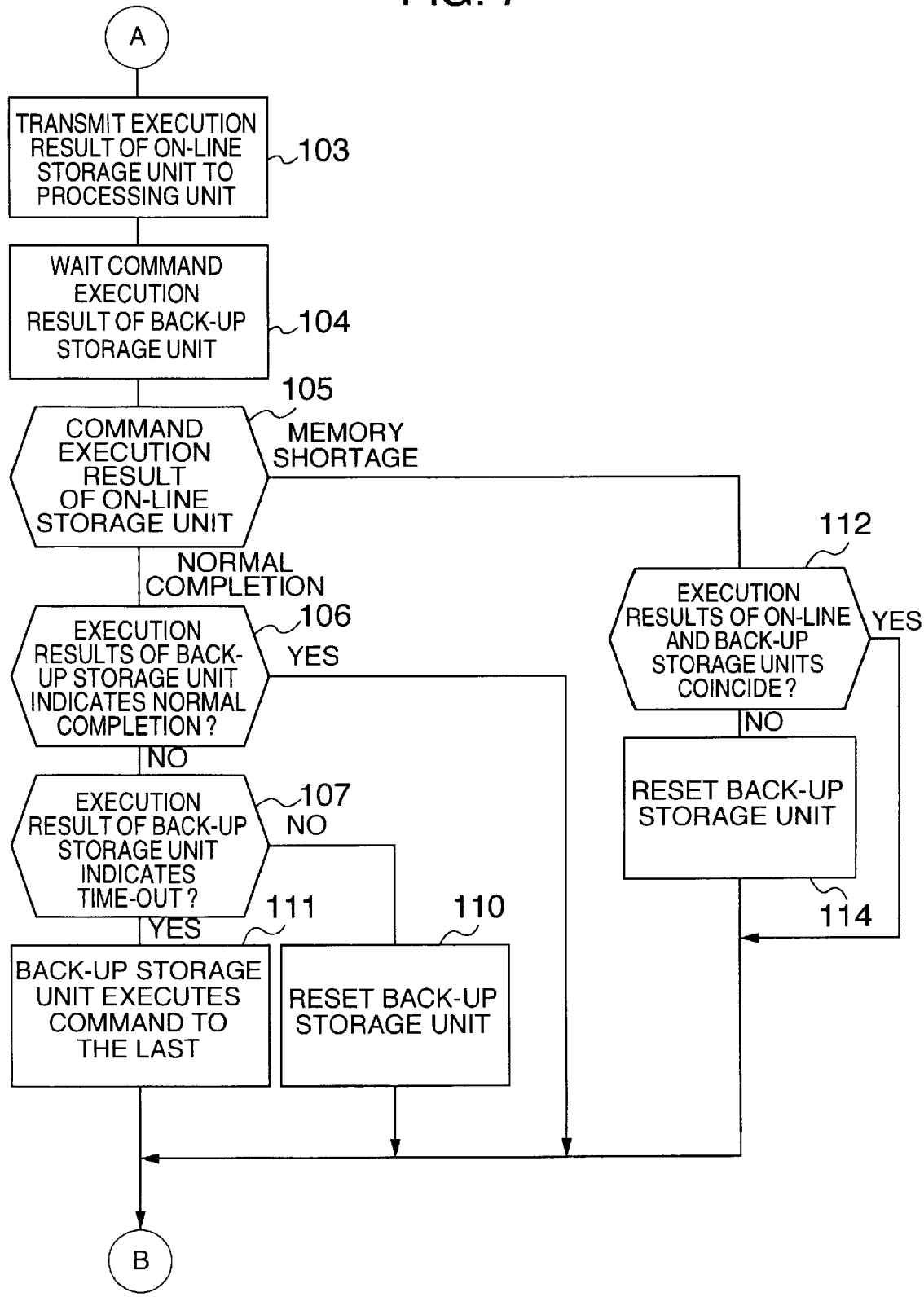
FIG. 7 shows a flow chart which continues from FIG. 6.

FIGS. 6 and 7 show flow charts of a process for the command received by the on-line storage unit 10.

When the on-line storage unit 10 receives the command from the processing units 20~22, it executes the process for the received command (step 100).

Then, the on-line storage unit 10 transmits the received command to the back-up storage unit 11 (step 101). Then, the execution result of the command by the on-line storage unit 10 is determined (step 102).

When the execution result of the on-line storage unit 10 indicates the normal completion or the memory shortage, the on-line storage unit 10 transmits the execution result of the command to the processing units 20~22 without waiting the execution result of the command by the back-up storage unit 11 (step 103). The execution result of the command by the back-up storage unit 11 is monitored (step 104).

When the execution result of the command by the on-line storage unit 10 indicates the memory shortage (step 105), whether both the execution result of the on-line storage unit 10 and the execution result of the back-up storage unit 11 indicate the memory shortage or not is determined (step 112), and if both indicate the memory shortage, the on-line storage unit 10 checks if a command is stored in the buffer or not (step 120). If a command is stored in the buffer 10-13, the process returns to the step 100 to continue the processing of the next command. If no command is stored in the buffer 10-13, the reception of a command is monitored (step 122).

When the execution result of the command by the back-up storage unit 11 does indicate the memory shortage, it means that the execution result of the command by the on-line storage unit 10 and the execution result of the command by the back-up storage unit 11 do not coincide and it is determined that a fault has occurred in the back-up storage unit 11 and the back-up storage unit 11 is reset (step 114).

When the execution result of the command by the on-line storage unit 10 indicates the normal completion (step 105), whether the execution result of the command by the back-up storage unit 11 indicates the normal completion or not is determined (step 106).

When the execution result of the command by the back-up storage unit 11 indicates the normal completion, the processing of the next command is executed (step 120).

When the execution result of the command by the back-up storage unit 11 does not indicate the normal completion, whether the execution result of the command by the back-up storage unit 11 indicates the time-out or not is determined (step 107).

If the execution result of the command by the back-up storage unit 11 indicates the time-out, the back-up storage unit 11 execute the command until the last (step 111). If the execution result of the command by the back-up storage unit 11 indicates the memory shortage or the fault, the back-up storage unit 11 is reset (step 110).

On the other hand, in the step 102, if the execution result of the command by the on-line storage unit 10 indicates the time-out, the on-line storage unit 10 waits the execution result of the back-up storage unit 11 (step 130). Then, the execution result of the back-up storage unit 11 is determined (step 131). If the execution result of the back-up storage unit 11 indicates the normal completion or the time-out, a resumption point is set in the resumption table 10-14 (step 132). Then, the on-line storage unit 10 transmits the execution result of its own command to the processing units 20~22 (step 133).

In the step 131, if the execution result of the back-up storage unit 11 indicates the memory shortage or the fault, it is determined that a fault has occurred in the back-up storage unit 11 and the back-up storage unit 11 is reset (step 134). Then, the processing of the next command (step 120) is executed.

In the step 102, if the execution result of the on-line storage unit 10 indicates the fault, the on-line storage unit 10 waits the execution result of the back-up storage unit 11 (step 140). Then, the on-line storage unit 10 transmits the execution result of the command by the back-up storage unit 11 to the processing units 20~22 (step 141). Then, the back-up storage unit 11 resets the on-line storage unit 10 to switch the back-up storage unit 11 to the on-line (step 142). Then, the storage unit 10 which has newly become on-line executes the processing of the next command (step 120).

A process when the time-out occurs is now explained in detail.

Figure 8:
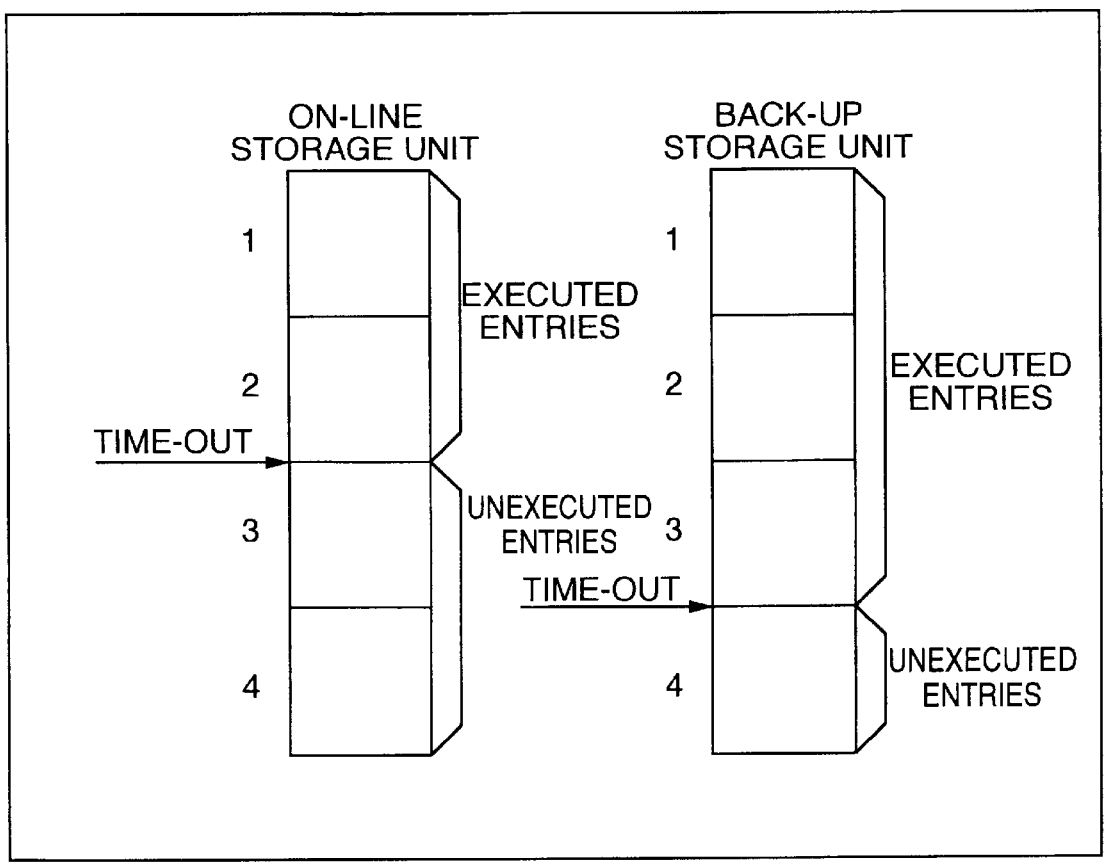
FIG. 8 illustrates a process at time-out.

FIG. 8 illustrates a process of the time-out.

It is assumed here that the time-out 81 is indicated after the on-line storage unit 10 has processed two entries and the time-out 81 is indicated after the back-up storage unit 11 has processed three entries.

Figure 9:
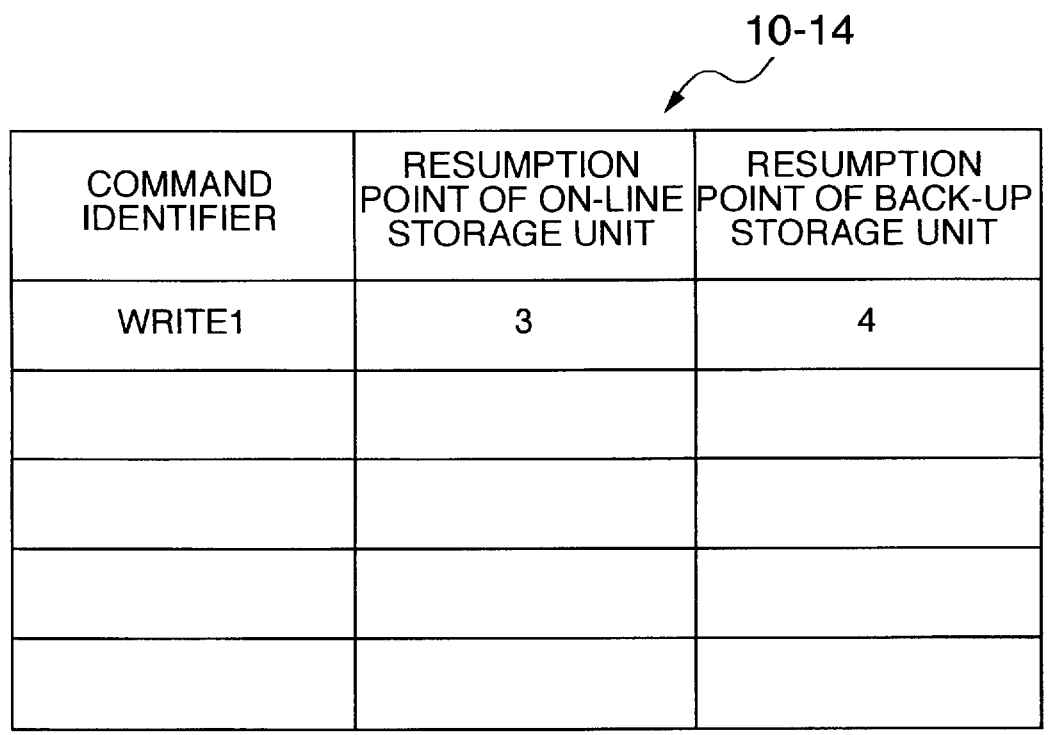
FIG. 9 illustrates a content of a resumption table at the time-out.

FIG. 9 illustrates a content of the resumption table 10-14 in the time-out case shown in FIG. 8. It is a table which is used when the execution result of the command by the on-line storage unit 10 indicates the time-out.

The resumption table 10-14 is a table to manage a resumption point of the back-up storage unit 11 by the on-line storage unit 10. When the execution result of the command indicates the time-out 81, an identifier of the corresponding command and the resumption points of the on-line and back-up storage units 10 and 11 are stored in the resumption table 10-14.

In the example of FIG. 8, the command identifier is "WRITE1", the resumption point of the on-line storage unit is "3" and the resumption point of the back-up storage unit is "4".

Figure 10A:
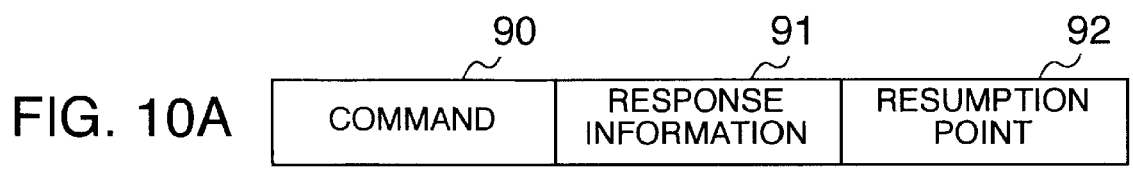
FIGS. 10A, 10B and 10C illustrate response information at the time-out.
Figure 10B:
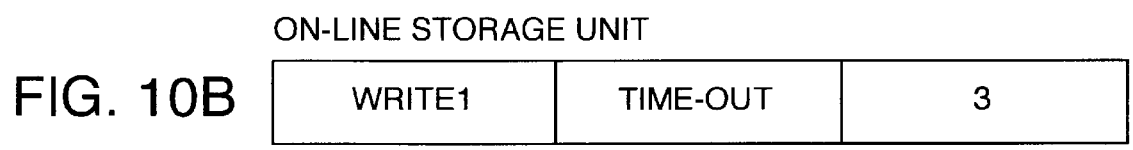
Figure 10C:
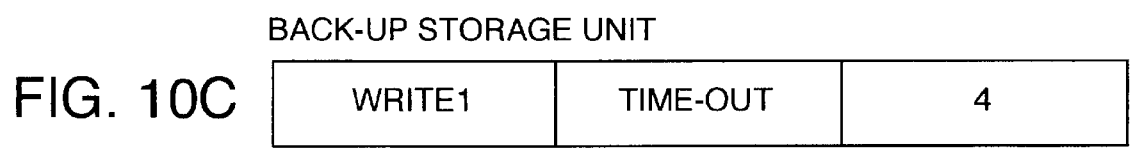

FIGS. 10A~10C illustrate the response information of the command.

The response information for the time-out comprises a command identifier 90, response information 91 and a resumption point 92 as shown in FIG. 10A. In the example shown in FIG. 8, the identifier "WRITE1" indicating the command being executed is set in the command identifier 90, the "time-out" is set in the response information 91, "3" is set in the resumption position 92 of the on-line storage unit as shown in FIG. 10B and "4" is set in the resumption position of the back-up storage unit as shown in FIG. 10C.

Figure 11:
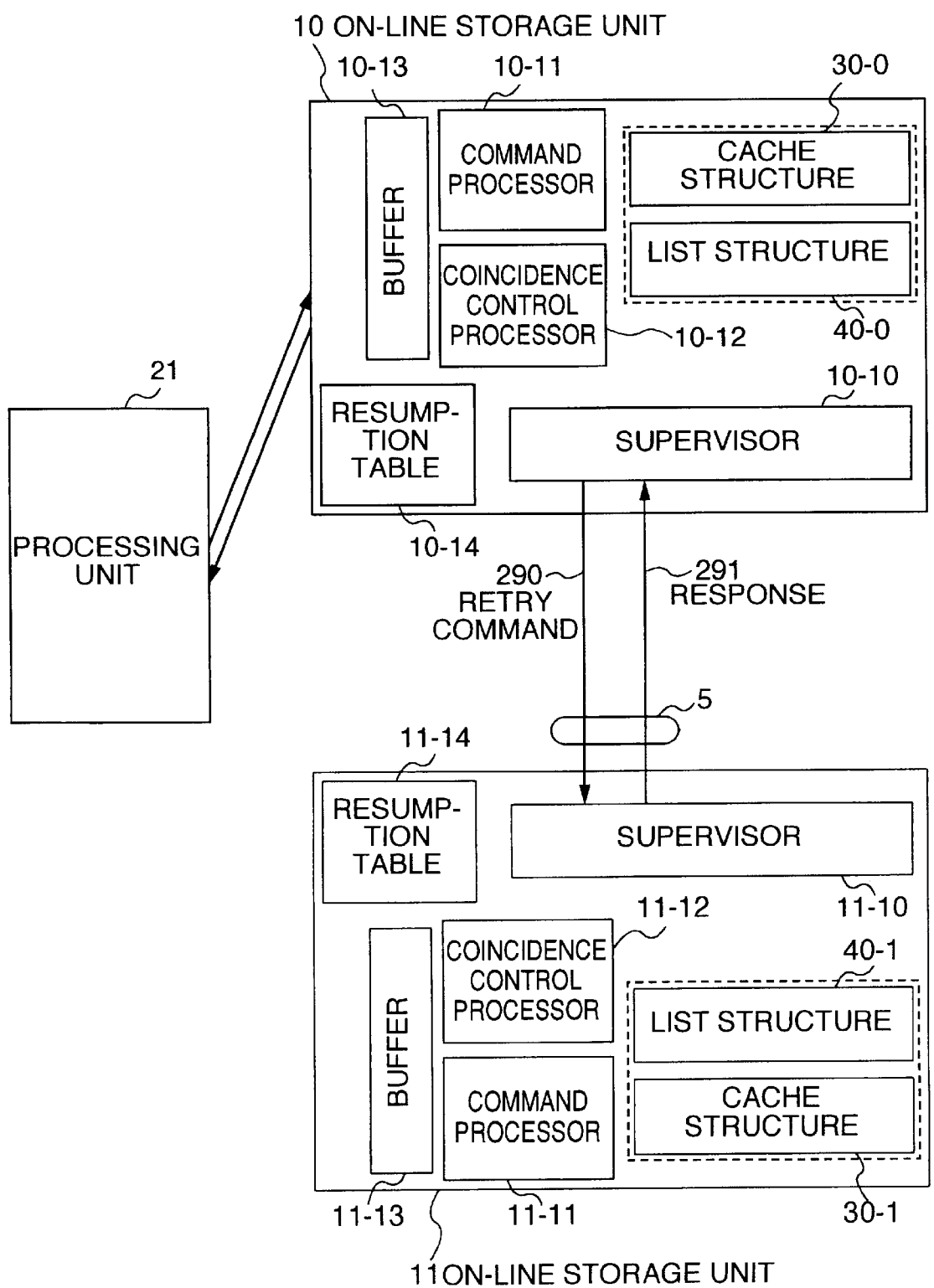
FIG. 11 illustrates retry of a command.

FIG. 11 illustrates retry of the command.

When the time-out occurs in the on-line storage unit 10, the processing units 20~22 must retransmit the command for which the time-out has occurred. The processing units 20~22 set the resumption position in the command and issues the command to the on-line storage unit 10.

The on-line storage unit 10 stores all write data in the buffer 10-13 when it first receives the data.

Then, the on-line storage unit 10 looks up the resumption table 10-14 to continue the process from the point specified by the resumption point 92. The on-line storage unit 10 transfers the command to the back-up storage unit 11. When a plurality of write data are transmitted, it transmits all write data.

The back-up storage unit 11 stores all write data in the data buffer 10-13.

When the back-up storage unit 11 receives a retry command 290 from the on-line storage unit 10, it resumes the process from the resumption point specified by the resumption table 11-14. When the process is completed, the response message 291 is returned to the on-line storage unit 10.

In this manner, the on-line storage unit 10 receives the command from the processing units 20~22 and transfers the received command to the back-up storage unit 11 so that the storage contents of the on-line storage unit 10 and the back-up storage unit 11 coincide.

When the status transition of the cache structure or the list structure occurs in the storage units 10 and 11, it should be notified to the processing units 20~22. The status transition command is explained below.

Figure 12:
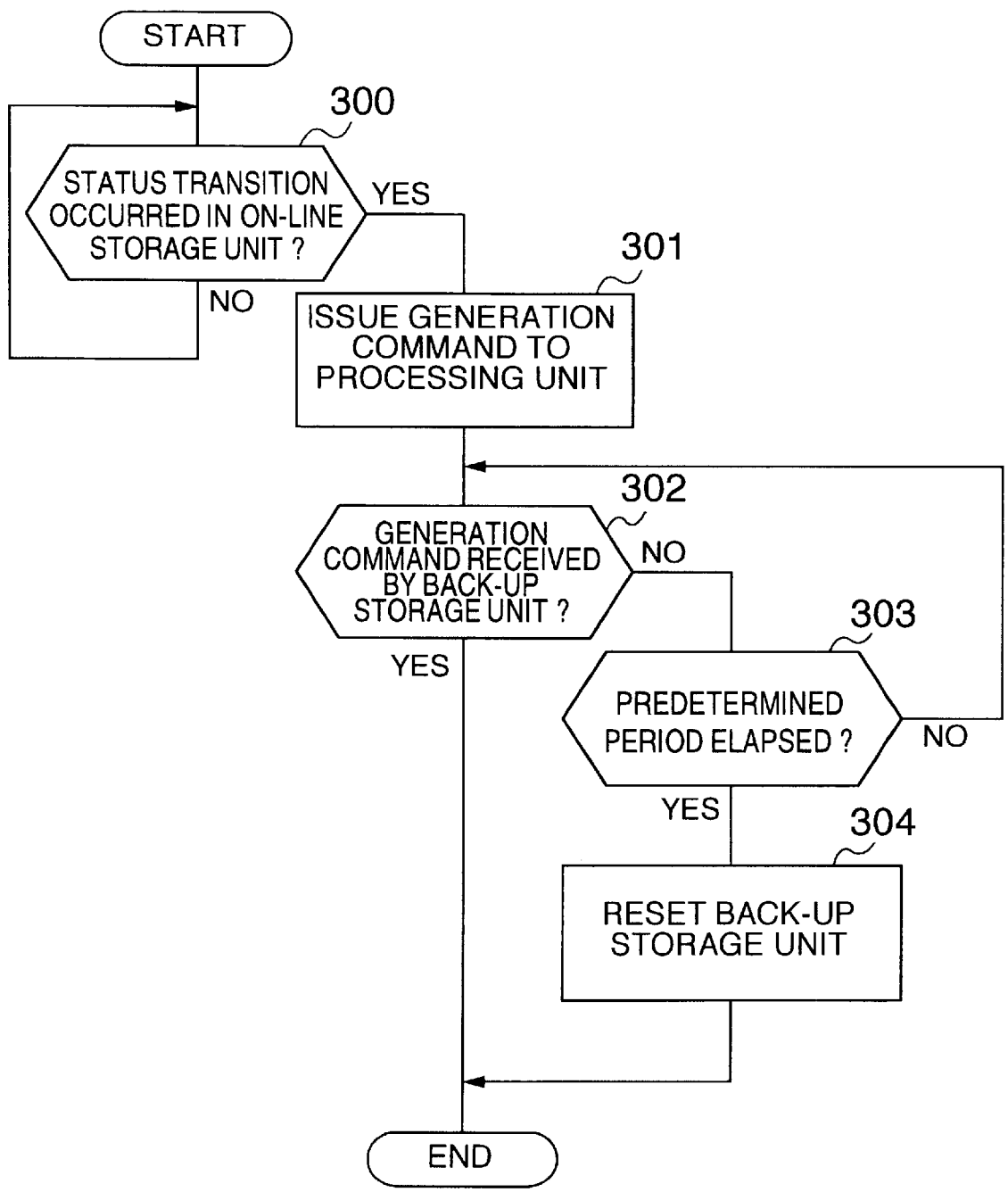
FIG. 12 shows a flow chart of a coincidence control process of a status transition command.

FIG. 12 shows a coincidence control process of the status transition command.

The status transition command is a command to notify the occurrence of the status transition (writing or deletion of entry) in the list structure 40 (40-1, 40-1) or the cache structure 30 (30-0, 30-1) to the processing units 20~22.

The status transition command is generated when the same event occurs in the on-line storage unit 10 and the back-up storage unit 11. Thus, whether the on-line and back-up storage units 10 and 11 operate normally or not may be checked by checking whether the status transition commands occurs synchronously in the on-line storage unit 10 and the back-up storage unit 11.

If the status transition occurs in only one of the storage units, the storage unit in which the status transition has not occurred is regarded as the occurrence of the fault and it is reset. This process is explained below.

When the status transition occurs in the on-line storage unit 10 (step 300), the on-line storage unit 10 issues the status transition command to the processing units 20~22 (step 301). The on-line storage unit 10 check whether it has received the same status transition command from the back-up storage unit 11 or not within a predetermined period (step 302).

If the on-line storage unit 10 receives the status transition command, it is determined that the back-up storage unit 11 is normal, but if it does not receive the status transition command within the predetermined period (step 303), the back-up storage unit 11 is reset (step 304).

In this manner, the on-line storage unit 10 and the back-up storage unit 11 execute the received commands so that the storage contents coincide.

While the present invention has been specifically described in connection with the embodiment, it should be understood that the present invention is not limited to the above embodiment and various modifications may be made without departing from the scope of the invention.

In accordance with the present invention, the command is issued from the processing units to only the on-line storage unit and the command is transferred from the on-line storage unit to the back-up storage unit and the processing for the received commands is executed in the respective storage units. Thus, the overhead of the on-line storage unit is reduced when the duplex storage unit is structured by the hot stand-by system.

Further, even when a plurality of processing units, the on-line storage unit and the back-up storage unit are connected through the channel device, the storage contents of the on-line storage unit and the back-up storage unit are made coincident.

What is claimed is:

1. In a computer system comprising two storage units having processors, one being an on-line storage unit and the other being a back-up storage unit, and a processing unit for accessing said storage units by issuing commands, a method for making storage contents of two storage units coincident comprising the steps of:

issuing a command from said processing unit to said on-line storage unit;

transferring the command received by said on-line storage unit to said back-up storage unit; and executing respective processes for the received command in said on-line and back-up storage units.

2. A method for making storage contents of two storage units coincident according to claim 1 wherein said on-line storage unit transmits only a command to update a content of said on-line storage unit to said back-up storage unit.

3. A method for making storage contents of two storage units coincident according to claim 1 wherein when an execution result of the command by said on-line storage unit indicate normal completion, said on-line storage unit does not compare the execution result by said on-line storage unit with an execution result of the command by said back-up storage unit to said processing unit, and when the execution result of the command by said back-up storage unit indicates memory shortage or fault, the back-up storage unit is reset.

4. A method for making storage contents of two storage unit coincident according to claim 1 wherein when an execution result of the command by said on-line storage unit indicates normal completion, said on-line storage unit does not compare the execution result of said on-line storage unit with an execution result of the command by said back-up storage unit but transfers the execution result of the command by said on-line storage unit to said processing unit, and when the execution result of the command by said back-up storage unit indicates time-out, said on-line storage unit causes the processing for the command in said back-up storage unit to be executed to the last.

5. A method for making storage contents of two storage units coincident according to claim 1 wherein said processing unit is connected to said on-line storage unit and said back-up storage unit by a channel device.

6. A computer system comprising:

a first storage unit having a processor working as an on-line storage unit;

a second storage unit having another processor working as a back-up storage unit; and a processing unit for accessing said first storage unit by issuing a command thereto; wherein said first storage unit sends said command to said second storage unit and execute a process in accordance with said issued command, and said second storage unit executes a process in accordance with said sent command.

* * * * *